(12) United States Patent
Chang

(10) Patent No.: US 6,922,735 B2
(45) Date of Patent: Jul. 26, 2005

(54) MANAGEMENT OF CO-PROCESSOR INFORMATION BY INTEGRATING NON-PROGRAM INFORMATION WITH PROGRAM INFORMATION

(75) Inventor: Kenneth Hung-Yi Chang, Daly City, CA (US)

(73) Assignee: Texas Instruments Incorporated, Dallas, TX (US)

( * ) Notice: Subject to any disclaimer, the term of this patent is extended or adjusted under 35 U.S.C. 154(b) by 323 days.

(21) Appl. No.: 09/822,753

(22) Filed: Mar. 30, 2001

(65) Prior Publication Data

US 2004/0205744 A1 Oct. 14, 2004

Related U.S. Application Data

(60) Provisional application No. 60/194,258, filed on Apr. 3, 2000.

(51) Int. Cl.[7] .............................. G06F 3/00; G06F 9/44; G06F 15/00
(52) U.S. Cl. ..................... 710/5; 710/6; 710/7; 710/10; 710/11; 710/31; 710/32; 710/33; 710/36; 710/107; 712/400; 712/405; 717/121; 717/168
(58) Field of Search ............................. 710/5, 6, 7, 10, 710/11, 31, 32, 33, 36, 107, 16, 18, 29, 37, 38, 104; 712/400, 405; 717/121, 168, 11; 707/103; 709/203

(56) References Cited

U.S. PATENT DOCUMENTS

| | | | | |
|---|---|---|---|---|
| 4,724,521 A | * | 2/1988 | Carron et al. ................ 717/175 |
| 5,263,166 A | | 11/1993 | Desmons | |
| 5,604,905 A | | 2/1997 | Tevanian et al. | |
| 5,732,219 A | * | 3/1998 | Blumer et al. ............... 709/227 |
| 5,806,068 A | * | 9/1998 | Shaw et al. .............. 707/103 R |
| 5,815,709 A | * | 9/1998 | Waldo et al. ................ 712/300 |
| 5,950,010 A | * | 9/1999 | Hesse et al. ................. 717/178 |
| 6,018,627 A | * | 1/2000 | Iyengar et al. ............... 717/103 |
| 6,047,127 A | * | 4/2000 | McCarten et al. ........... 717/173 |
| 6,051,032 A | * | 4/2000 | Harrison et al. ............. 717/170 |
| 6,233,590 B1 | * | 5/2001 | Shaw et al. .................. 715/500 |
| 6,282,711 B1 | * | 8/2001 | Halpern et al. .............. 717/175 |
| 6,751,647 B1 | * | 6/2004 | Srinivasan et al. .......... 709/203 |
| 2001/0039569 A1 | * | 11/2001 | Bretscher ..................... 709/205 |

FOREIGN PATENT DOCUMENTS

| | | | |
|---|---|---|---|
| EP | 0 910 014 A2 | 4/1999 | |
| JP | 11203187 A * | 7/1999 | ............ G06F/12/00 |
| JP | 2000339211 A * | 12/2000 | ............ G06F/12/00 |
| JP | 2001125610 A * | 5/2001 | ............ G05B/19/05 |

* cited by examiner

*Primary Examiner*—Jeffrey Gaffin
*Assistant Examiner*—Angel L. Casiano
(74) *Attorney, Agent, or Firm*—Ronald O. Neerings; Wade James Brady, III; Frederick J. Telecky, Jr.

(57) ABSTRACT

A system including a host processor (11) operating in combination with one or more co-processors (13) is disclosed. In this system, a file storage facility (17) stores executable files (40) that are called by a server (15) in the host processor (11) by way of an application programming interface (API) (16). In the disclosed system, the executable files (40) include both a program (obj 2) together with information (obj 2 attrs) indicative of a condition needed for execution of the program. Based on the condition information, the program (obj 2) is downloaded (67) to the co-processor (13), and executed by the co-processor (13) if the the condition is satisfied.

20 Claims, 4 Drawing Sheets

| NODE ATTRIBUTE FIELD | FIELD VALUE |
|---|---|
| THE NAME OF A SPECIFIC NODE ATTRIBUTE | THE VALUE OF THE NODE ATTRIBUTE |
|  |  |
| EXAMPLE: |  |
| NAME | "codec" |
| UUID | "1CE5D975-4E11-11d4-A755-00C04F0C04F8" |
| PRIORITY LEVEL | 15 |
| NUMBER OF CHANNELS | 4 |
| BUFFERS PER CHANNEL | 2 |
| NODE SIZE | 2048 |
| CREATE FUNCTION | codecCreate |
| EXECUTE FUNCTION | codecExecute |
| DELETE FUNCTION | codecDelete |
| ....... | ....... |

MANAGEMENT OF CO-PROCESSOR INFORMATION BY INTEGRATING NON-PROGRAM INFORMATION WITH PROGRAM INFORMATION

This application claims the priority under 35 U.S.C. 119(e)(1) of copending U.S. provisional application No. 60/194,258 filed on Apr. 3, 2000, incorporated herein by reference.

FIELD OF THE INVENTION

The invention relates generally to data processing and, more particularly, to management of co-processor information.

BACKGROUND OF THE INVENTION

Data processing systems (including single-chip systems) which utilize one or more host processors (for example microprocessors) and one or more co-processors (for example further microprocessors or digital signal processors) under control of the host processor(s) are well known in the art. In such systems, a co-processor is typically configured to perform desired functions by storing associated program information in a ROM (or other program memory) of the co-processor. The operational capability of the co-processor thus corresponds to, and is limited by, the functionality defined by the program(s) stored in its ROM.

It therefore becomes advantageous to provide systems wherein the host processor(s) can dynamically download desired programs to the co-processor(s) in response to user requests. For example, a user of a mobile telephone might initially wish to configure the mobile telephone's co-processor(s) to perform speech coding functions in support of voice communications, and might later wish to configure the co-processor(s) to perform functions in support of wireless internet access. Accordingly, in this example, the host processor(s) would first download into the co-processor(s) a program or programs for configuring the co-processor(s) as a speech coder, and would thereafter download a program or programs for configuring the co-processor(s) as an internet access port.

Different programs (also referred to herein as objects) have different platform requirements, for example, program memory size, data memory size, clock speed, etc. Therefore, a given program may not be suitable for execution on a given co-processor. The suitability of a given program for execution on a given co-processor can be determined by a host processor before downloading the program to the co-processor, provided the program developer can provide to the host processor information indicative of the platform requirements of the program. In systems with multiple co-processors, the host processor may be able to use the platform requirement information at runtime to identify an available co-processor which satisfies the platform requirements of the program. The host processor can then download the program to the identified co-processor.

In conventional practice, non-program information has typically been stored separately from the executable file that contains the program. This practice disadvantageously dictates the use of an auxiliary data source for non-program information, for example an SQL engine, Microsoft's registry, or even a simple text file. This also disadvantageously requires that two separate files be handled, the executable and the non-program information file.

It is desirable in view of the foregoing to provide for efficient communication of non-program information, such as platform requirement information, from the program developer to the host processor at runtime.

The present invention provides for efficient communication of non-program information, e.g. platform requirement information, from the program developer to the host processor at runtime. The non-program information is integrated along with the corresponding program information into an executable file which is used by the host processor to download the program information to a selected co-processor.

DETAILED DESCRIPTION

Figure 1:
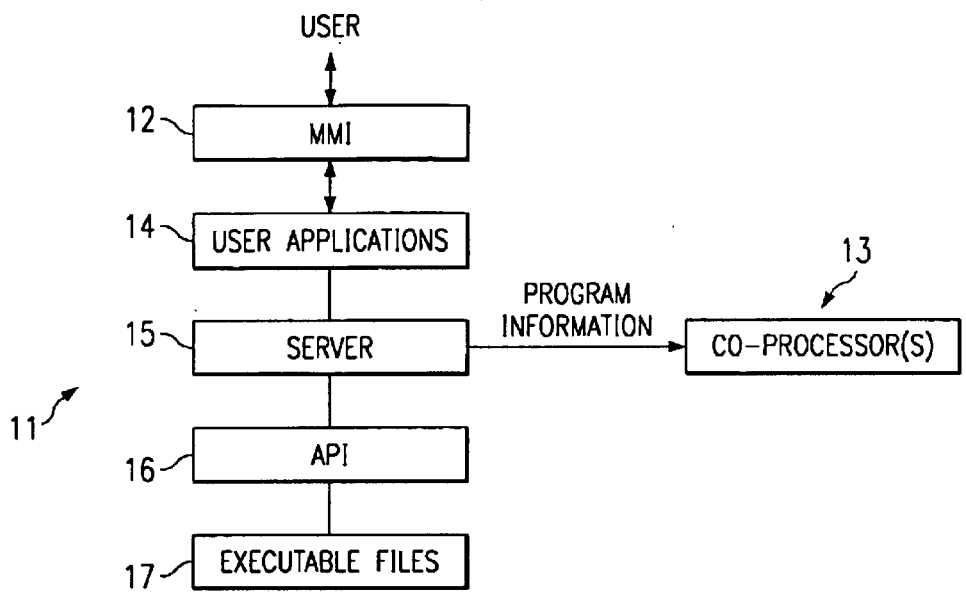
FIG. 1 diagrammatically illustrates pertinent portions of exemplary embodiments of a data processing system according to the invention.

FIG. 1 diagrammatically illustrates pertinent portions of exemplary embodiments of a data processing system according to the invention. Examples of the data processing system include wireless telephones, laptop computers, and set-top boxes.

The exemplary system of FIG. 1 includes a host processor 11 (for example a microprocessor) and one or more co-processors 13 (for example additional microprocessors and/or DSPs). The processors 11 and 13 can be embedded together in a single integrated circuit chip, or can be provided on separate integrated circuit chips. A man-machine interface (MMI) 12, for example a keyboard/keypad, visual display, etc. permits a user to access user applications 14 associated with the host processor 11. When a user application determines that a co-processor should execute a particular function, the application directs a server 15 in the host processor 11 to obtain program information to be downloaded from the server 15 to the co-processor, and then used by the co-processor in performing the desired function. In response to the request from the user application 14, the server 15 uses an application programming interface (API) 16 to retrieve the program information from a file storage facility (e.g. a file system or other file storage mechanism) 17 where executable files are stored.

According to the invention, a given executable file stored in the file storage facility 17 includes not only program information which the co-processor uses to perform the desired function, but also includes non-program information associated with the program information. For example, the non-program information could include platform requirement information such as described above, setup parameters, or other general properties of the program. The API 16 distinguishes the program information from the non-program information, and provides both sets of information to the server 15. Based on the non-program information, the server can, for example, make a determination as to which of a plurality of available co-processors is suitable for execution of the desired program, and can then forward the program information to the selected co-processor.

Figure 2:
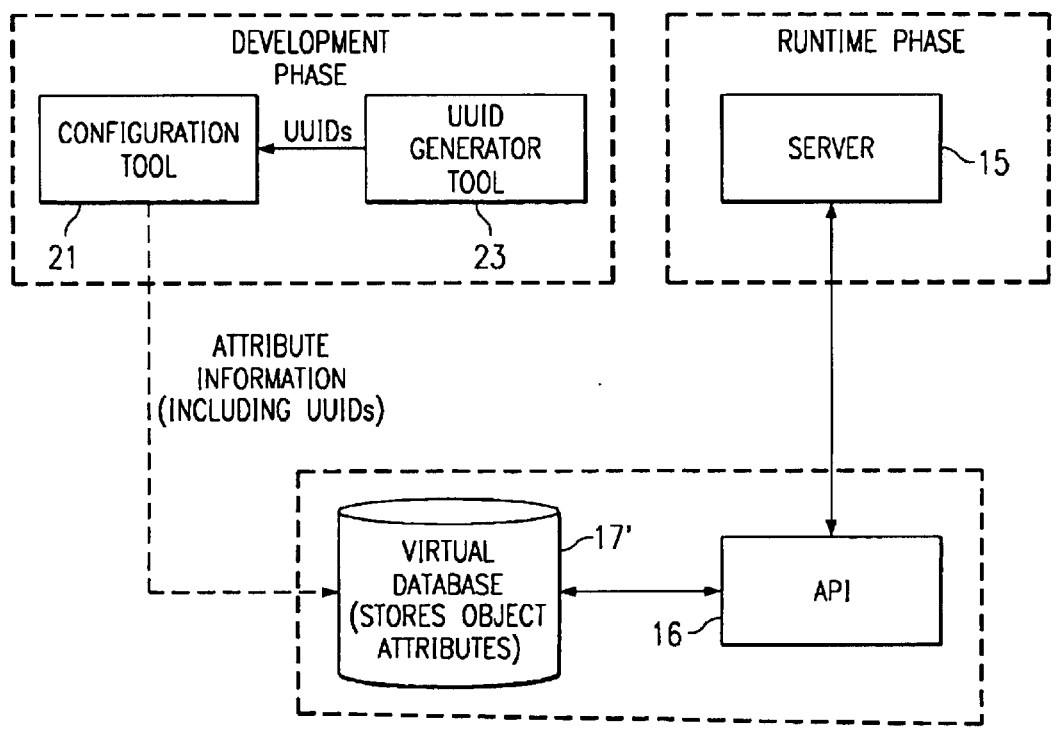
FIG. 2 diagrammatically illustrates an exemplary procedure for producing a virtual database within the file storage facility of FIG. 1.

FIG. 2 diagrammatically illustrates exemplary manners in which the aforementioned non-program information can be configured. As shown in FIG. 2, during a program development phase, the developer uses software tools to configure a virtual database 17' which stores object (i.e. program) attributes such as, for example, platform requirement information, setup parameters, etc. The virtual database 17' is provided within the storage facility 17 of FIG. 1 as will be described in more detail below. A configuration tool 21 provides the attribute (non-program) information. A UUID generation tool 23 provides to the configuration tool 21 a universally unique identifier (UUID) for identifying each set of attribute information stored in the virtual database 17'. The UUIDs are included in the attribute information provided by the configuration tool 21. After the virtual database 17' has been established during the development phase, the API 16 accesses the stored object attributes and provides them to the server 15 during the runtime phase.

Figure 3:
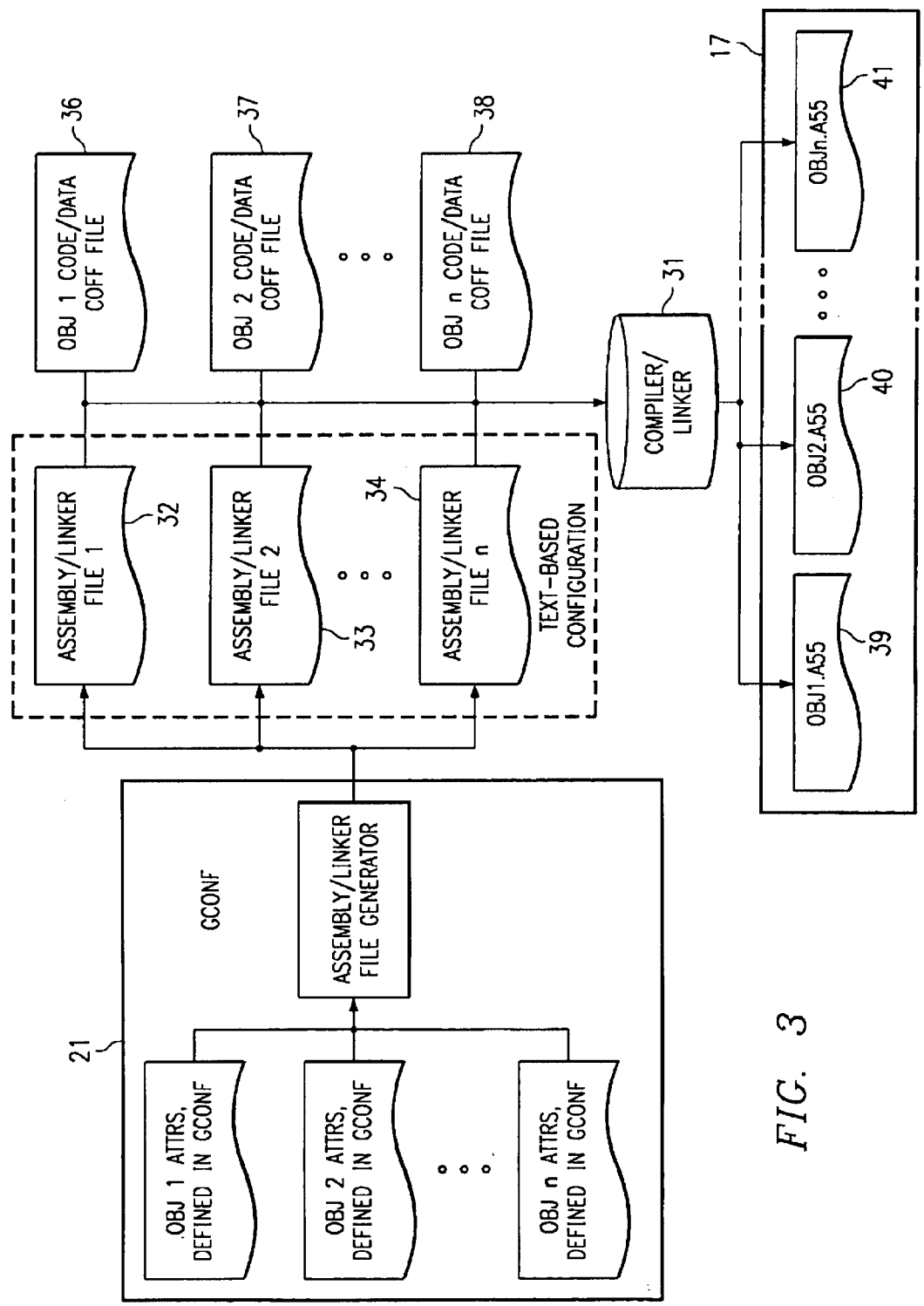
FIG. 3 illustrates portions of the process of FIG. 2 in greater detail.

FIG. 3 diagrammatically illustrates an exemplary process for providing the virtual database 17' of FIG. 2 in the storage facility 17 of FIG. 1. In the example of FIG. 3, the configuration tool 21 is based on Texas Instruments Incorporated's commercially available Graphical Configuration Tool (GCONF). This tool is a Windows GUI application that presents different configurable data modules in a manner similar to Windows Explorer. The developer can conduct a dialogue in conventional fashion with the GCONF tool, inputting the desired attributes for each program (or object) in FIG. 3. The programs are designated as obj1, obj2, . . . objn in FIG. 3. Using conventional techniques, the GCONF tool can be suitably programmed to convert the input attribute information into information which is suitable for integration into an executable file, for example a COFF (Common Object File Format) executable file. After the attribute information has been input into a suitable configuration file in the GCONF tool 21 during the aforementioned dialogue, the developer uses the GCONF "file/save" command, which prompts the GCONF tool to automatically generate header files, assembly macros and linker command files based on the attribute information provided by the developer during the dialogue process. The linker command files will contain the attribute is information in a format suitable for integration into an executable file.

Each of the assembly/linker files 32, 33 and 34 (which include the aforementioned linker command files) is combined with its associated program information (i.e., code and data) at 36, 37 and 38, which program information is contained in conventional executable files (e.g. COFF files). The combining operation can be performed by a conventional compiler/linker 31. The compiler/linker 31 combines the data in the assembly/linker files 32, 33 and 34 with the program information from the files 36, 37 and 38, respectively, to produce corresponding executable files, in this example COFF executable files 39, 40 and 41, that include both program information (from 36, 37 and 38) and non-program information (from 32, 33 and 34).

Figure 7:
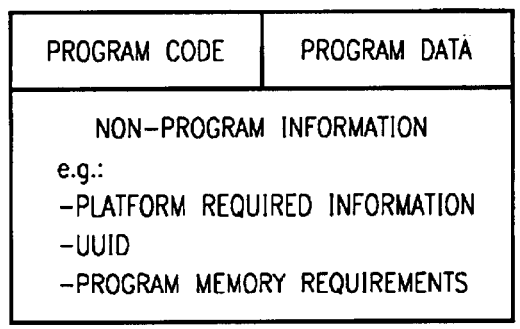
FIG. 7 illustrates an example of an executable file which can be produced by the process of FIGS. 2 and 3 and stored in the file storage facility of FIGS. 1, 3 and 5.

Each of the executable files 39, 40 and 41 illustrated in FIG. 3 includes program information and non-program information, as illustrated generally by the example of FIG. 7. The executable file 40 illustrated in FIG. 7 includes program information (code and data) and corresponding non-program information, for example platform requirement information for the program, as described above. Although the example executable file 40 of FIG. 7 includes only a single program and its associated non-program information, other executable files in the storage facility 17 could include code and data corresponding to a plurality of programs, together with a plurality of sets of non-program information respectively corresponding to the plurality of programs. The non-program information included in the various executable files 39, 40 and 41 in FIG. 3 constitutes the virtual database 17' of FIG. 2, more particularly a virtual database including non-program information corresponding to the various programs stored in the storage facility 17.

Figures 4, 5:
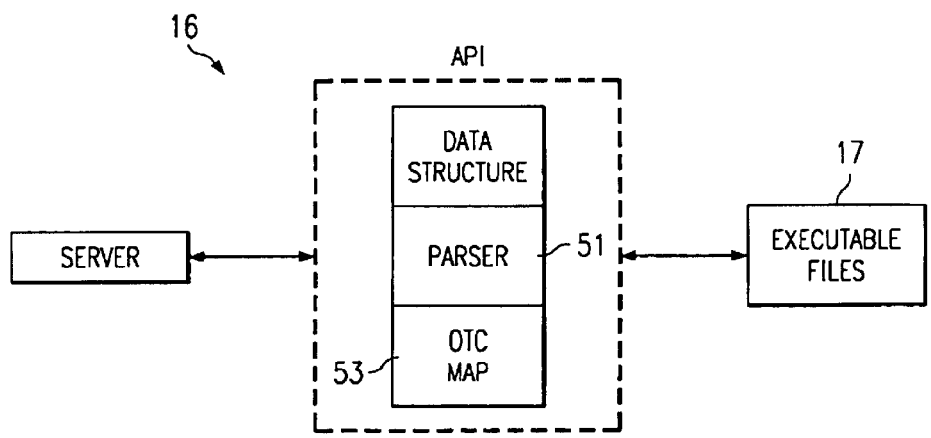
FIG. 4 illustrates in tabular format examples of non-program information which can be provided by a developer and stored in the virtual database of FIG. 2.
FIG. 5 diagrammatically illustrates pertinent portions of exemplary embodiments of the application programming interface of FIGS. 1 and 2.

FIG. 4 shows examples of attribute information associated with an exemplary codec node (i.e., codec program). As shown, the aforementioned UUID can be obtained by the developer (from the tool 23 of FIG. 2) and provided as attribute information for the codec program.

Referring again to FIG. 1, when the server 15 begins the process of loading an executable file onto a coprocessor for the first time, the API 16 will record the file path of the executable file. In some embodiments, the API 16 performs data retrieval through a parser 51 as illustrated in FIG. 5. The parser 51 uses the UUID information described above to identify uniquely each program in the storage facility 17, and to identify data sections within the executable files wherein the corresponding non-program information is stored.

Executable files that conform to COFF, for example the COFF utilized by Texas Instruments Incorporated, support non-downloadable data regions. Using this feature of COFF, the compiler/linker 31 of FIG. 3 automatically stores the non-program information within the non-downloadable data regions of the COFF executable files. Thus, the parser 51 will search through the COFF executable files within the storage facility 17, comparing the UUIDs of the non-downloadable data sections with the UUID provided to the parser 51 by the user (via the server 15). When the parser finds a non-downloadable data section UUID match, the non-program information from that section can, in some embodiments, be loaded into a corresponding data structure in the API 16. The non-program information can be provided to the server 15 along with the corresponding program information read from the storage facility 17, whereupon the server 15 can utilize conventional techniques to, for example, evaluate whether a given co-processor is suitable for execution of the desired program and/or to setup/configure the co-processor to execute the desired program. The parser 51 can be used to determine the file path information described above, and this information can be stored in an OTC (Object to COFF) map 53. This map 53 can thereafter use the user-provided UUID information to map the various programs to their corresponding COFF files.

Figure 6:
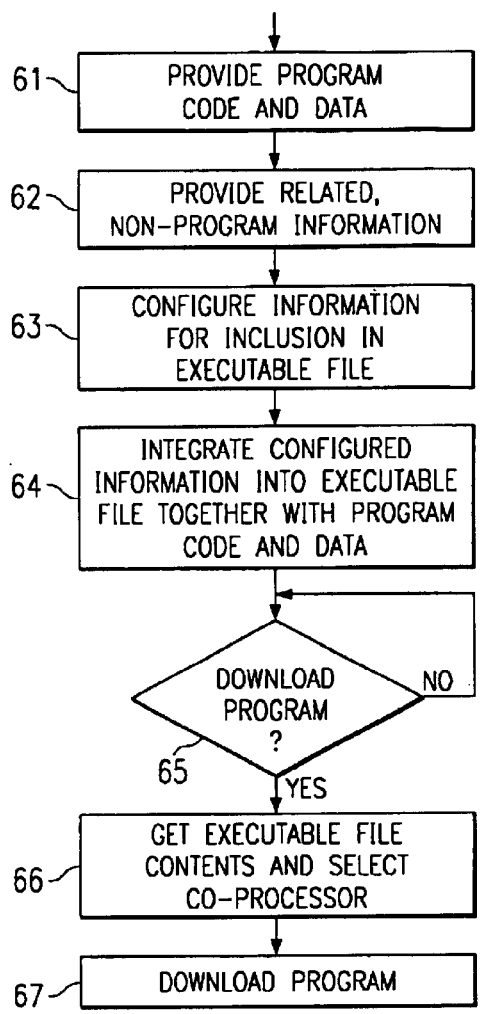
FIG. 6 illustrates exemplary operations according to the invention.

FIG. 6 illustrates exemplary operations of the present invention. The program code and data is provided at 61, and the related non-program information is provided at 62. At 63, the non-program information is configured for inclusion in an executable file. At 64, the configured information is integrated into an executable file together with the program code and data. When it is desired at 65 to download the program from the host processor to a co-processor, the server at 66 obtains the executable file contents, and uses the non-program information to select the co-processor, after which the program can be downloaded into the co-processor at 67.

Figure 8:
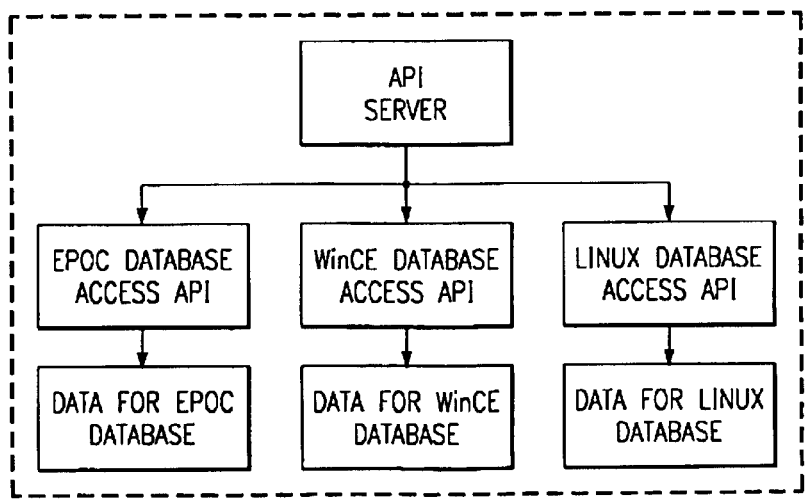
FIG. 8 diagrammatically illustrates, by comparison with FIG. 1, exemplary advantages of the present invention.

FIG. 8 is provided to illustrate by comparison exemplary advantages of the invention described above with respect to FIGS. 1–7. FIG. 8 diagrammatically illustrates the consequences of the lack of database standardization across different target operating systems. Whereas the invention described above with respect to FIGS. 1–7 is clearly cooperable with multiple target operating systems while using only a single API design and a single (virtual) database configuration, FIG. 8 illustrates that, without the invention of FIGS. 1–7, multiple target operating systems could be supported only by multiple corresponding database access APIs, one database access API for each OS-specific database. As a result, the overall complexity of the system would increase significantly as clearly shown by a comparison of FIGS. 1 and 8.

It should also be noted that the invention described above with respect to FIGS. 1–7 provides a unique data access approach inasmuch as no other database server will be able to access the data in the above-described virtual database 17' unless, for example, that server has access to the UUIDs that are needed to access the data in the virtual database 17'.

The above-described integration of non-program information with program information in an executable file permits non-program information to be communicated from the developer to the server of the host processor in an efficient manner, and without increasing the size of the runtime program. This is accomplished by, for example, taking advantage of the non-downloadable data section feature of COFF executables. The invention eliminates the need for an auxiliary database on the host processor, thus saving the resources required by a traditional database, which is particularly advantageous for resource-constrained systems such as a system on a chip. The invention further simplifies the process of downloading a program to a co-processor because both program and non-program information can be provided in a single file, thereby advantageously avoiding the conventional requirement of handling two separate files. Also, as described above with respect to FIG. 8, the invention provides compatibility across multiple platforms with far less complexity than would result through application of conventional techniques.

Although exemplary embodiments of the invention are described above in detail, this does not limit the scope of the invention, which can be practiced in a variety of embodiments.

What is claimed is:

1. A method of downloading a program to a data processor in a system having at least one data processor, comprising:
   providing the program in an executable file together with non-program information comprised of at least one platform requirement for execution of the program;
   retrieving the program and non-program formation;
   determining, from the non-program information in the executable file, whether at least one data processor in the system satisfies the at least one platform requirement for the retrieved program; and
   responsive to the determining step, downloading the program to one of the at least one data processors that satisfies the platform requirement.

2. The method of claim 1, wherein the non-program information further comprises configuration information; and further comprising:
   configuring the data processor using the configuration information.

3. The method of claim 2, wherein said configuration information includes a data processor setup parameter associated with said program.

4. The method of claim 1, further comprising:
   selecting the data processor from a plurality of data processors in the system, using the at least one platform requirement.

5. The method of claim 1, wherein said providing step includes providing the program and the non-program information in a COFF executable file.

6. The method of claim 1, wherein said providing step includes using a compiler/linker to combine a first file containing the non-programing information with a second file containing the program.

7. The method of claim 1, wherein said providing step includes providing the non-program information in a non-downloadable section of the executable file.

8. The method of claim 1, wherein said providing step includes converting input information into said non-program information which is suitable for integration with the program in the executable file.

9. The method of claim 1, further comprising:
   providing universally unique identifiers for uniquely identifying each of a plurality of programs and their respectively corresponding non-program information; and
   integrating the corresponding universally unique identifier into the executable file along with the program and the corresponding non-program information.

10. The method of claim 1, wherein said providing step includes integrating a plurality of programs and non-program information corresponding to each of the plurality of programs into a single executable file.

11. The method of claim 10, further comprising:
   storing, in a file storage facility, a plurality of executable files, each of which includes a program and corresponding non-program information.

12. A data processing apparatus, comprising:
   a first data processor;
   a file storage facility coupled to said first data processor, said file storage facility including an executable file containing a program and non-program information comprised of at least one platform requirement for execution of said program; and
   wherein said first data processor is programmed to perform a sequence of operations comprising:
      obtaining said program and said non-program information from said file storage facility;
      determining, from the non-program information in the executable file, whether a second data processor satisfies the at least one platform requirement for the obtained program; and
      responsive to said second data processor satisfying the at least one platform requirement, downloading said program to said second data processor.

13. A data processing apparatus, comprising:
   a first data processor;
   a second data processor coupled to said first data processor; and
   a file storage facility coupled to said first data processor, said file storage facility including an executable file containing a program and non-program information comprised of at least one platform requirement for execution of said program; and
   wherein said first data processor is programmed to perform a sequence of operations comprising:
      obtaining said program and said non-program information from said file storage facility;

determining, from the non-vrogram information in the executable file, whether said second data processor satisfies the at least one platform requirement for the obtained program; and responsive to said second data processor satisfying the at least one platform requirement, downloading said obtained program to said second data processor.

14. The apparatus of claim 13, wherein the first and second data processors are provided on a single integrated circuit chip.

15. The apparatus of claim 14, further comprising:

a man/machine interface coupled to said first data processor for permitting communication between said first data processor and a user.

16. The apparatus of claim 15, wherein said man/machine interface includes at least one of a tactile interface and a visual interface.

17. The apparatus of claim 13, wherein said first data processor is a microprocessors and said second data processor is a digital signal processor.

18. The apparatus of claim 13, including a third data processor coupled to said first data processor;

and wherein the first data processor is also programmed to select one of the second and third data processors, using said non-program information.

19. The apparatus of claim 18, wherein the first, second, and third data processors provided on a single integrated circuit chip.

20. The apparatus of claim 13, wherein the non-program information further comprises configuration information;

and wherein said first data processor is also programmed to configure said second data processor using said configuration information.

* * * * *